(12) United States Patent
Shinohara et al.

(10) Patent No.: US 8,428,854 B2
(45) Date of Patent: Apr. 23, 2013

(54) INTERNAL EGR CONTROL SYSTEM FOR INTERNAL COMBUSTION ENGINE

(75) Inventors: Toshinari Shinohara, Saitama-ken (JP); Toru Kitamura, Saitama-ken (JP); Chiho Itoga, Saitama-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 489 days.

(21) Appl. No.: 12/746,460

(22) PCT Filed: Sep. 4, 2008

(86) PCT No.: PCT/JP2008/065953
§ 371 (c)(1),
(2), (4) Date: Jun. 4, 2010

(87) PCT Pub. No.: WO2009/081624
PCT Pub. Date: Jul. 2, 2009

(65) Prior Publication Data
US 2010/0242930 A1    Sep. 30, 2010

(30) Foreign Application Priority Data

Dec. 20, 2007  (JP) ................................ 2007-328455

(51) Int. Cl.
*F02M 25/07*  (2006.01)
*F02B 47/08*  (2006.01)
*G06F 19/00*  (2011.01)
*F01L 1/34*   (2006.01)

(52) U.S. Cl.
USPC ..................................... 701/108; 123/568.14

(58) Field of Classification Search .... 123/90.15–90.18, 123/316, 568.14; 701/103, 108
See application file for complete search history.

(56) References Cited

U.S. PATENT DOCUMENTS

| | | | | |
|---|---|---|---|---|
| 6,840,235 | B2 * | 1/2005 | Koseki et al. | 123/568.14 |
| 7,367,310 | B2 * | 5/2008 | Kakuya et al. | 123/295 |
| 7,412,967 | B2 * | 8/2008 | Kumano et al. | 123/435 |
| 7,735,477 | B2 * | 6/2010 | Kitamura et al. | 123/568.14 |
| 7,848,869 | B2 * | 12/2010 | Kakuya et al. | 701/108 |
| 2011/0017157 | A1 * | 1/2011 | Itoga | 123/90.15 |

FOREIGN PATENT DOCUMENTS

| | | | | |
|---|---|---|---|---|
| JP | 2004-251182 A | | 9/2004 | |
| JP | 2005214102 A | * | 8/2005 | 123/568.14 |
| JP | 2007-100526 A | | 4/2007 | |
| JP | 2007-211649 A | | 8/2007 | |
| JP | 2007-231834 A | | 9/2007 | |
| JP | 2007-262992 A | | 10/2007 | |
| JP | 2008-106654 A | | 5/2008 | |
| WO | WO-2009/081624 A1 | | 7/2009 | |

\* cited by examiner

*Primary Examiner* — Willis R Wolfe, Jr.
(74) *Attorney, Agent, or Firm* — Arent Fox LLP (57) ABSTRACT

There is provided an internal EGR control system for an internal combustion engine, which is capable of ensuring an excellent combustion state by properly controlling an internal EGR amount. The internal EGR control system is comprised of a variable valve operating mechanism 60 for controlling an internal EGR amount of combustion gases caused to remain in cylinders 3a by changing valve-closing timing CAEXVC of exhaust valves 9, target internal EGR amount-setting means 2 for setting a target internal EGR amount of the internal EGR amount EGRINC according to detected operating conditions NE, PMCMD of the engine 3, valve-closing timing-calculating means 2 for calculating valve-closing timing of the exhaust valves 9 based on the set target internal EGR amount EGRINC, valve-closing timing-correcting means 2 for correcting the calculated valve-closing timing of the exhaust valves according to the acquired wall surface temperature parameter TW indicative of wall surface temperature of the cylinder 3a, and control means 2 for controlling the variable valve operating mechanism based on the corrected valve-closing timing of the exhaust valves 9.

3 Claims, 11 Drawing Sheets

FIG. 14

INTERNAL EGR CONTROL SYSTEM FOR INTERNAL COMBUSTION ENGINE

FIELD OF THE INVENTION

The present invention relates to an internal EGR control system for an internal combustion engine, for controlling internal EGR in which combustion gases are caused to remain in cylinders.

BACKGROUND ART

The present applicant has already proposed an internal EGR control system of this kind e.g. in Patent Literature 1. In this internal EGR control system, the phase of an exhaust cam with respect to a crankshaft is changed by a variable cam phase mechanism of a hydraulically-driven type, and the lift of an exhaust valve is changed by a variable lift mechanism of an electrically-driven type, whereby the amount of internal EGR caused to remain in cylinders is controlled.

More specifically, a target internal EGR amount is calculated according to an engine speed and a demanded torque, and a target cam phase is calculated according to the calculated target internal EGR amount, whereby the variable cam phase mechanism is controlled such that the target cam phase is achieved. Further, according to the target internal EGR amount, the valve-closing timing of the exhaust valve is calculated. Then, according to the calculated valve-closing timing of the exhaust valve and the actual cam phase, a target lift is calculated, whereby the variable lift mechanism is controlled such that the target lift is achieved. As a result, even when the actual cam phase is late in converging to the target cam phase due to delay in the response of the variable cam phase mechanism, the internal EGR amount is controlled such that it becomes equal to the target internal EGR amount.

However, in the above-described internal EGR control system, the target internal EGR amount is calculated according to the engine speed and the demanded torque. Therefore, when the temperature of the wall surface of each cylinder is low during e.g. warm-up operation, loss of heat from combustion gases to the wall surface of each cylinder increases, so that the temperature of working medium before combustion in the cylinders lowers, which sometimes makes the combustion state unstable even if the internal EGR amount is the same. There is room for improvement in this point.

The present invention has been made to provide a solution to the above-described problem, and an object thereof is to provide an internal EGR control system for an internal combustion engine, which is capable of ensuring an excellent combustion state by properly controlling an internal EGR amount.

[Patent Literature 1]
Japanese Laid-Open Patent Publication (Kokai) No. 2008-106654

DISCLOSURE OF THE INVENTION

To attain the object, the invention as claimed in claim 1 provides an internal EGR control system 1 for an internal combustion engine 3, for controlling internal EGR in which combustion gases are caused to remain in a cylinder 3a, comprising a variable valve operating mechanism (exhaust-side valve-operating mechanism 60) that controls an internal EGR amount by changing valve-closing timing (valve-closing crank angle CAEXVC in the embodiments (the same applies hereinafter in this section)) of exhaust valves 9 of the engine 3, operating condition-detecting means (ECU 2, crank angle sensor 21, accelerator pedal opening sensor 28) for detecting operating conditions (engine speed NE, demanded torque PMCMD) of the engine 3, target internal EGR amount-setting means (ECU 2, step 1 in FIG. 7) for setting a target internal EGR amount EGRINC serving as a target of the internal EGR amount according to the detected operating conditions of the engine, valve-closing timing-calculating means (ECU 2, step 6) for calculating valve-closing timing of the exhaust valves 9 according to the set target internal EGR amount EGRINC, wall surface temperature parameter-acquiring means (coolant temperature sensor 26) for acquiring a wall surface temperature parameter (engine coolant temperature TW) indicative of temperature of a wall surface of the cylinder 3a, valve-closing timing-correcting means (ECU 2, steps 7, 8) for correcting the calculated valve-closing timing of the exhaust valves 9 according to the acquired wall surface temperature parameter, and control means (ECU 2, steps 9 to 12) for controlling the variable valve operating mechanism based on the corrected valve-closing timing of the exhaust valves 9.

According to this internal EGR control system, the internal EGR amount in which combustion gases are caused to remain in the cylinders is controlled by changing the valve-closing timing of the exhaust valves using the variable valve operating mechanism. Further, the valve-closing timing of the exhaust valves is calculated based on the target internal EGR amount set according to the detected operating condition of the engine. The valve-closing timing is corrected according to the acquired wall surface temperature parameter. The variable valve operating mechanism is controlled based on the corrected valve-closing timing of the exhaust valve. As described above, when the wall surface temperature is low, the loss of heat from combustion gases to the wall surface of the cylinders increases. Therefore, by correcting the valve-closing timing according to the wall surface temperature parameter, it is possible to control the internal EGR amount to an appropriate amount which compensates for influence caused by the loss of heat due to the wall surface temperature, and hence it is possible to properly control the temperature of the working medium before combustion in the cylinders, which makes it possible to excellently perform the subsequent combustion.

The invention as claimed in claim 2 is an internal EGR control system 1 for an internal combustion engine 3, for controlling internal EGR in which combustion gases are caused to remain in a cylinder 3a, comprising a variable valve operating mechanism (exhaust-side valve-operating mechanism 60) that controls an internal EGR amount by changing valve-closing timing (valve-closing crank angle CAEXVC) of exhaust valves 9 of the engine 3, wall surface temperature parameter-acquiring means (coolant temperature sensor 26) for acquiring a wall surface temperature parameter (engine coolant temperature TW) indicative of temperature of a wall surface of the cylinder 3a, combustion gas temperature-estimating means (ECU 2, step 32 in FIG. 11) for estimating temperature of combustion gases TEXGAS according to the acquired wall surface temperature parameter, operating condition-detecting means (ECU 2, crank angle sensor 21, accelerator pedal opening sensor 28) for detecting operating conditions (engine speed NE, demanded torque PMCMD) of the engine 3, target internal EGR amount-setting means (ECU 2, step 33) for setting a target internal EGR amount EGRINC serving as a target of the internal EGR amount according to the estimated temperature of combustion gases and the detected operating condition of the engine 3, valve-closing timing-calculating means (ECU 2, step 37) for calculating valve-closing timing of the exhaust valves 9 according to the set target internal EGR amount EGRINC, control means (ECU 2, steps 38 to 41) for controlling the variable valve operating mechanism based on the calculated valve-closing timing of the exhaust valves 9.

According to this internal EGR control system for the internal combustion engine, the internal EGR amount in which combustion gases are caused to remain in the cylinders is controlled by changing the valve-closing timing of the exhaust valves using the variable valve operating mechanism. Further, the temperature of combustion gases is estimated according to the wall surface temperature parameter indicative of temperature of the wall surface of the cylinders, which is acquired by the wall surface temperature parameter-acquiring means. The target internal EGR amount is set according to the estimated temperature of combustion gases and the detected operating condition of the engine. Then, the valve-closing timing of the exhaust valve is calculated based on the set target internal EGR amount, and the variable valve operating mechanism is controlled based on the calculated valve-closing timing. As described above, since the temperature of combustion gases is estimated according to the wall surface temperature parameter, it is possible to properly estimate the temperature of combustion gases while compensating for the loss of heat due to the wall surface temperature. Therefore, by setting the target internal EGR amount according to the properly estimated temperature of combustion gases, it is possible to control the internal EGR amount to a proper value compensating for the loss of heat due to the wall surface temperature, and hence it is possible to properly control the temperature of working medium before combustion in the cylinders, which makes it possible to ensure the excellent combustion state.

The invention as claimed in claim 3 is an internal EGR control system 1 as claimed in claim 1 or 2, wherein the wall surface temperature parameter is coolant temperature of an engine 3.

The coolant temperature of the engine is closely related to the temperature of the wall surface of the cylinders, and excellently indicates the temperature of the wall surface, and hence it is possible to obtain the above-described advantageous effects by using the coolant temperature of the engine as the wall surface temperature parameter. Further, the engine is usually provided with a sensor for detecting the coolant temperature of the engine for control thereof, and hence by using such an existing component part, no increase in the cost is accompanied.

BEST MODE FOR CARRYING OUT THE INVENTION

Figure 1:
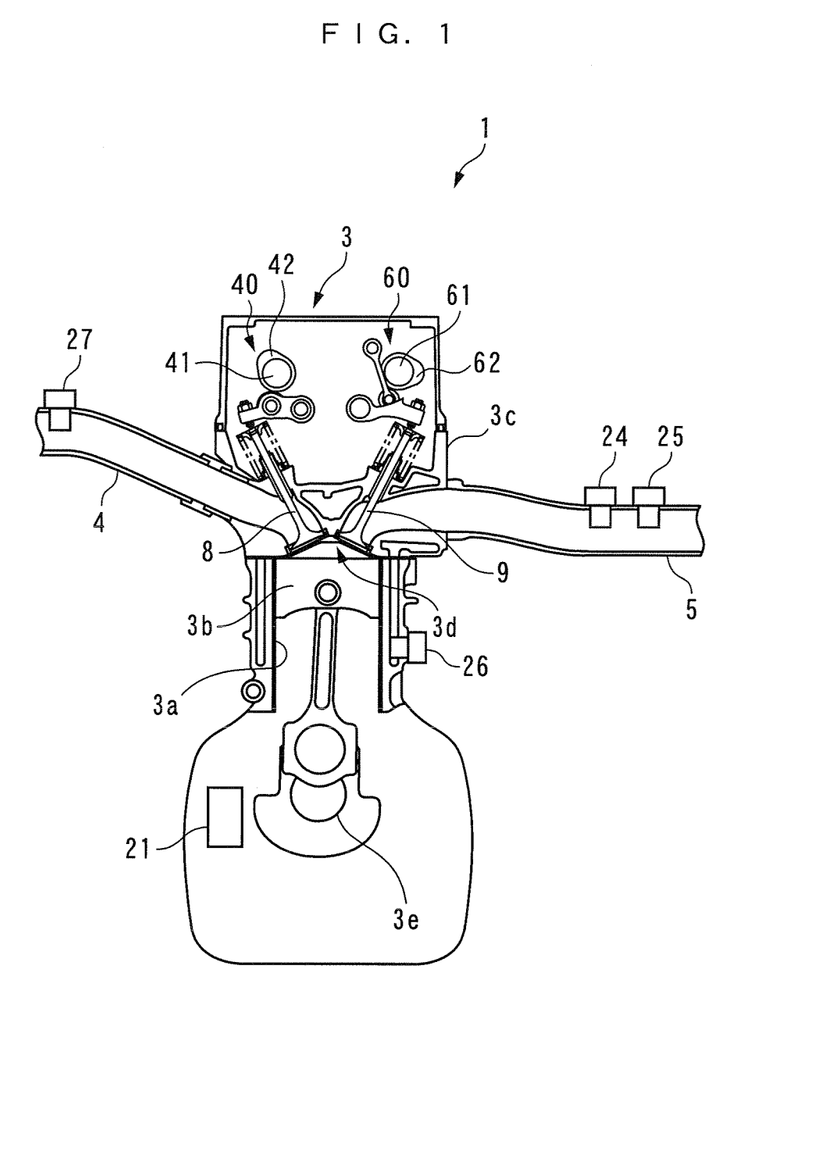
FIG. 1 A schematic view of an internal EGR control system according to the invention and an engine incorporating the same.

Hereafter, the invention will now be described in detail with reference to drawings showing preferred embodiments thereof. FIG. 1 schematically shows the arrangement of an internal EGR control system 1 according to an embodiment of the present invention and an internal combustion engine 3 (hereinafter simply referred to as the "engine") to which the internal EGR control system 1 is applied. The engine 3 is a four-cylinder gasoline engine that has four cylinders 3a (only one of which is shown), and is installed on a vehicle, not shown.

The engine 3 has a cylinder head 3c having an intake pipe 4 and an exhaust pipe 5 connected thereto, and fuel injection valves 6 and spark plugs 7 (see FIG. 2) mounted therethrough such that they face associated combustion chambers 3d of the cylinders 3a (only one of which is shown for each). The fuel injection valve 6 is of a direct fuel-injection type which is configured to directly inject fuel to the vicinity of the spark plug 7 in the combustion chamber 3d. The fuel injection amount and fuel injection timing of the fuel injection valve 6 are controlled by controlling the valve-opening time period and the valve-opening timing thereof by an ECU 2 (see FIG. 2). The ignition timing of the spark plug 7 is also controlled by the ECU 2. Further, the engine 3 performs spark ignition combustion (hereinafter referred to as "the SI combustion") in which an air-fuel mixture supplied to the combustion chamber 3d is ignited by the spark of the spark plug 7, and compression ignition combustion (hereinafter referred to as "the CI combustion") in which an air-fuel mixture is ignited by compression ignition, and the switching of the combustion therebetween is controlled by the ECU 2.

Further, each cylinder 3a has a pair of intake valves 8 and 8 (only one of which is shown), and a pair of exhaust valves 9 and 9 (only one of which is shown) disposed therein. The intake valves 8 and 8 are opened and closed by an intake-side valve-operating mechanism 40, and the exhaust valves 9 and 9 are opened and closed by an exhaust-side valve-operating mechanism 60. A description will be given of the intake-side valve-operating mechanism 40 and the exhaust-side valve-operating mechanism 60 with reference to FIGS. 3 to 6.

Figure 3:
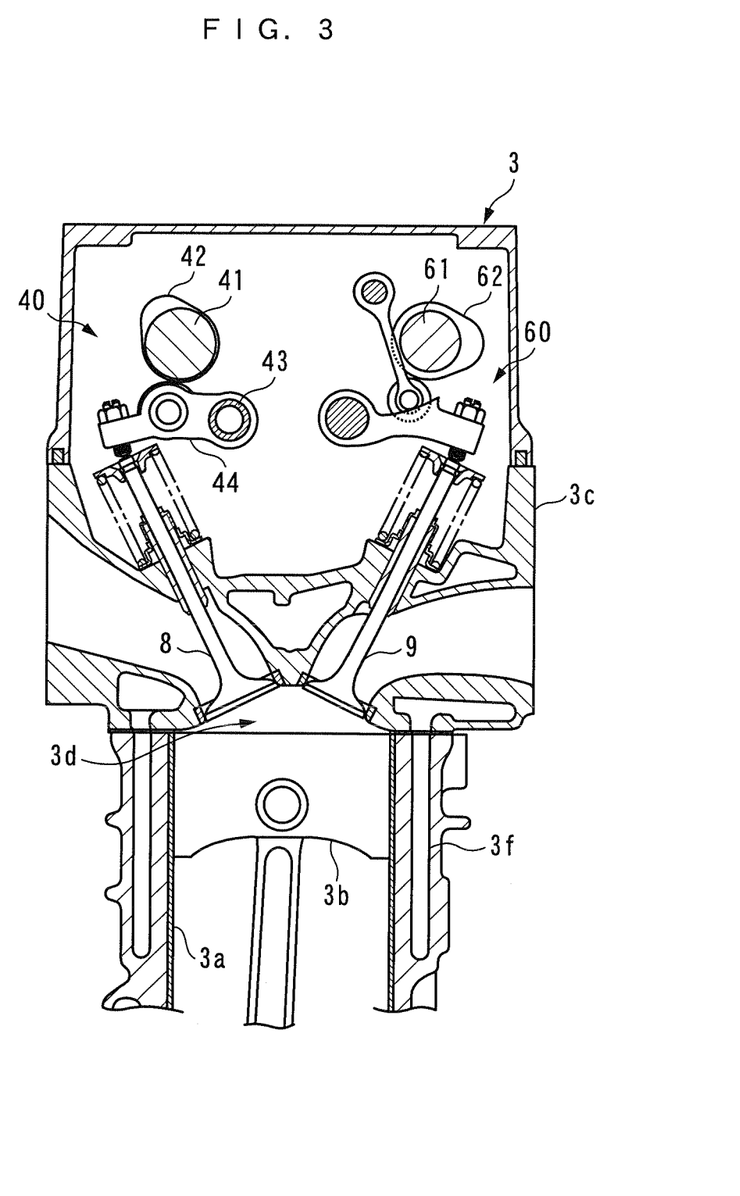
FIG. 3 A partial enlarged view of FIG. 1.

The intake-side valve-operating mechanism 40 is of an ordinary cam driven type, and as shown in FIG. 3, is comprised of a rotatable intake cam shaft 41, an intake cam 42 integrally formed with the intake cam shaft 41, a rocker arm shaft 43, and two rocker arms 44 and 44 (only one of which is shown) which are pivotally supported by the rocker arm shaft 43 for being brought into abutment with respective top ends of the intake valves 8 and 8.

The intake cam shaft 41 is connected to a crankshaft 3e via an intake sprocket and a timing chain (neither of which is shown), and rotates once whenever the crankshaft 3e rotates twice. As the intake cam shaft 41 is rotated, the rocker arms 44 and 44 are pressed by the intake cam 42 to be pivoted about the rocker arm shaft 43, whereby the intake valves 8 and 8 are opened and closed.

On the other hand, the exhaust-side valve-operating mechanism 60 is formed by a variable valve operating mechanism which steplessly changes the lift and valve timing of the exhaust valves 9. It should be noted that the phrase "the lift of the exhaust valves 9 (hereinafter referred to as the "exhaust lift") is intended to mean the maximum lift of the exhaust valves 9.

Figure 4:
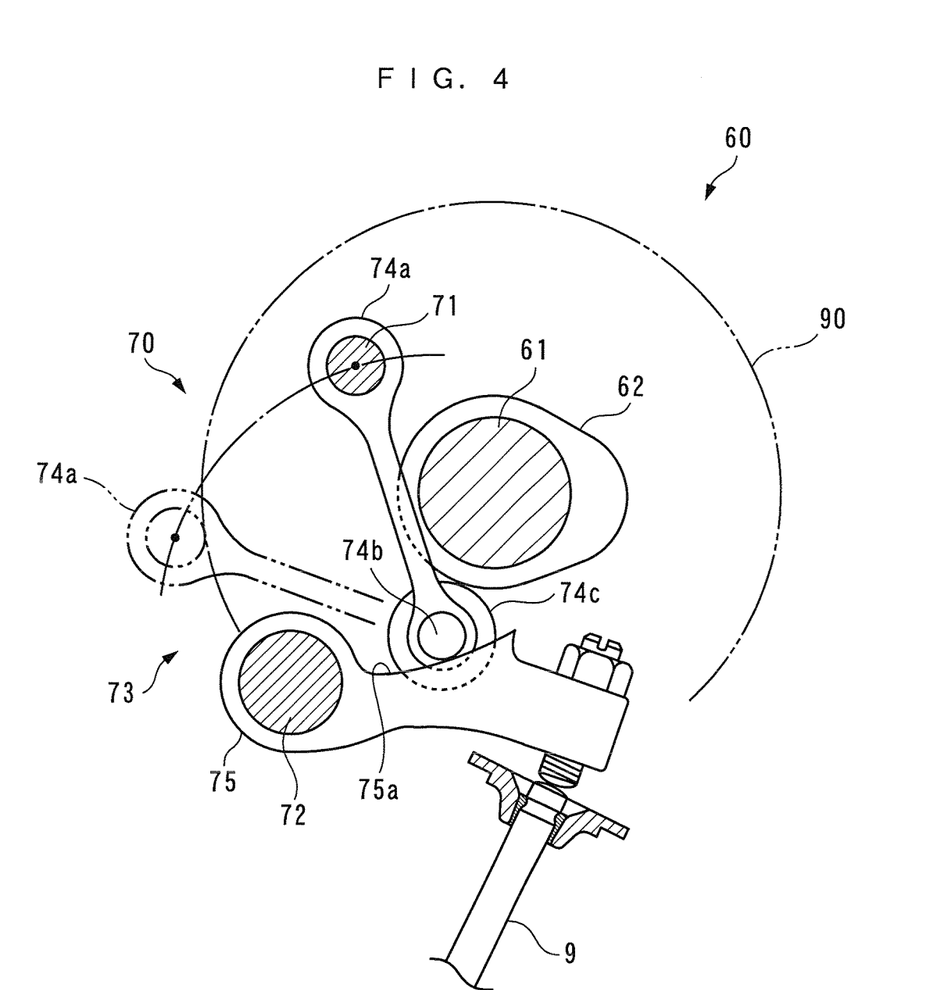
FIG. 4 A schematic view of an exhaust-side valve-operating mechanism.

As shown in FIG. 4, the exhaust-side valve-operating mechanism 60 is comprised of an exhaust cam shaft 61, an exhaust cam 62, a variable exhaust lift mechanism 70, and a variable exhaust cam phase mechanism 90.

The exhaust cam shaft 61 is connected to the crankshaft 3e via an exhaust sprocket and a timing chain (neither of which is shown), and rotates once whenever the crankshaft 3e rotates twice.

Figure 5:
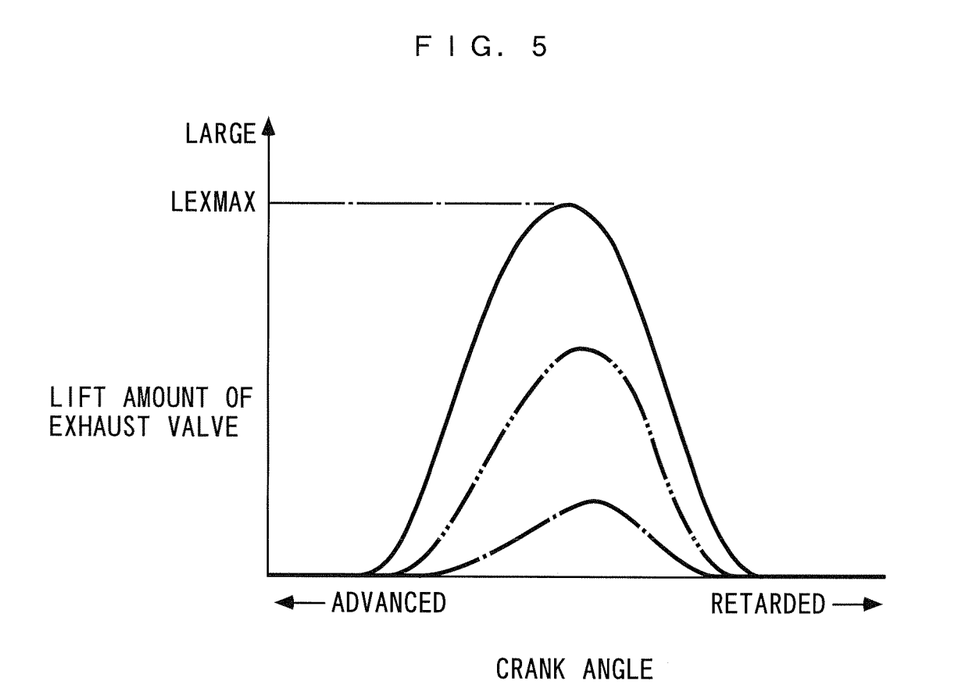
FIG. 5 A diagram showing changes in exhaust lift caused by a variable exhaust lift mechanism.
Figure 6:
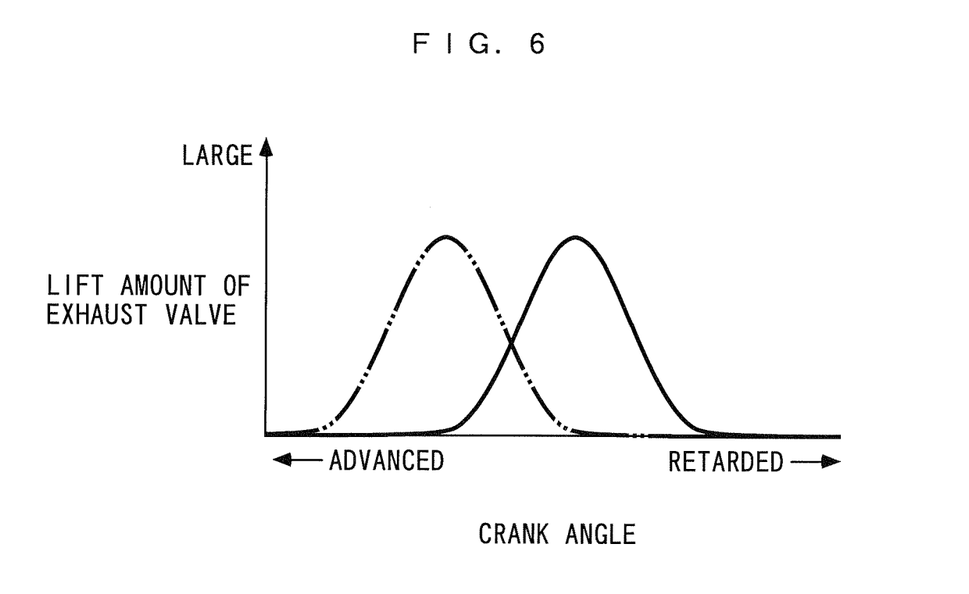
FIG. 6 A diagram showing valve lift curves of an exhaust valve assumed when a variable exhaust cam phase mechanism sets an exhaust cam phase to the most retarded value (solid line) and the most advanced value (two-dot chain line), respectively.

The variable exhaust lift mechanism 70 is configured to steplessly change the exhaust lift between a value of 0 and a predetermined maximum lift LEXMAX (see FIG. 5). The arrangement of the variable exhaust lift mechanism 70 is similar to that proposed in Japanese Laid-Open Patent Publication (Kokai) No. 2007-100522 by the present applicant, and hence hereinafter, a brief description will be given of the outline thereof.

The variable exhaust lift mechanism 70 is comprised of a control shaft 71, a rocker arm shaft 72, rocker arm mechanisms 73 which are provided on these shafts 71 and 72, for the respective cylinders 3a, an exhaust lift actuator 80 (see FIG. 2) which simultaneously drives these rocker arm mechanisms 73.

Figure 2:
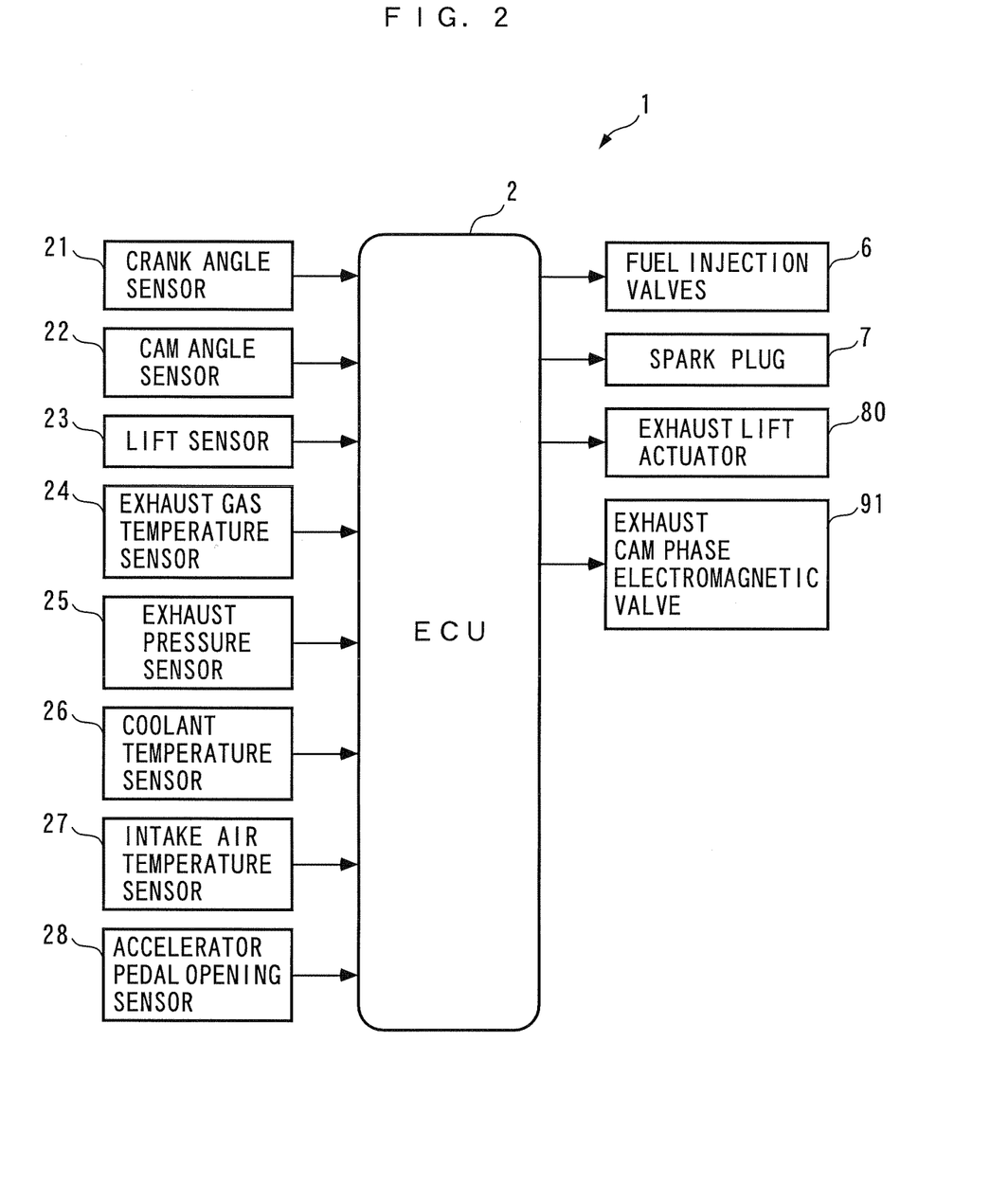
FIG. 2 A view of part of the internal EGR control system.

The rocker arm mechanisms 73 are each comprised of a link 74a, a roller shaft 74b, a roller 74c, and a rocker arm 75. Further, the exhaust lift actuator 80 is a combination of a motor and a reduction gear mechanism (neither of which is shown), and when the exhaust lift actuator 80 is driven by a lift control input U_SAAEX, referred to hereinafter, delivered from the ECU 2, the control shaft 71 is rotated, whereby the link 74a is pivoted about the roller shaft 74b.

When the link 74a is at a zero lift position indicated by a solid line in FIG. 4, if the roller 74c is pushed toward the rocker arm shaft 72 by the exhaust cam 62 along with rotation of the exhaust cam shaft 61, the link 74a is clockwise pivoted about the control shaft 71 as viewed in FIG. 4. At this time, the rocker arm 75 is held at a valve-closing position shown in FIG. 4 by the urging force of a valve spring since a guide surface 75a of the rocker arm 75 has a shape which coincides with an arc about the control shaft 71. Therefore, the exhaust lift is held at a value 0, and the exhaust valve 9 is held in a valve-closed state.

On the other hand, in a state in which the link 74a is pivoted from the zero lift position to the maximum lift position (position indicated by a two dot-chain line in FIG. 4) and is held thereat, if the link 74a is clockwise pivoted by rotation of the exhaust cam 62 about the control shaft 71 as viewed in FIG. 4, the rocker arm 75 is pivoted downward from the valve-closing position as viewed in FIG. 4, against the urging force of the valve spring to open the exhaust valve 9. At this time, the amount of pivotal motion, i.e. the exhaust lift of the rocker arm 75 becomes larger, as the link 74a is closer toward the maximum lift position.

With the above-described arrangement, as the link 74a is closer toward the maximum lift position, the exhaust valve 9 is opened with a larger lift. More specifically, during rotation of the exhaust cam 62, when the link 74a is at the maximum lift position, the exhaust valve 9 is opened along a valve lift curve indicated by a solid line illustrated in FIG. 5, and the exhaust lift thereof becomes equal to the maximum lift LEXMAX. Therefore, in this variable exhaust lift mechanism 70, by pivoting the link 74a between the zero lift position and the maximum lift position via the exhaust lift actuator 80, it is possible to steplessly vary the exhaust lift between the value of 0 and the predetermined maximum lift LEXMAX. Further, if an exhaust cam phase CAEX, referred to hereinafter, is the same, as the exhaust lift is larger, the valve-opening timing of the exhaust valve 9 becomes advanced, and the valve-closing timing thereof becomes retarded.

Further, the variable exhaust lift mechanism 70 is provided with a lift sensor 23 for detecting the exhaust lift (see FIG. 2). The lift sensor 23 detects a turning angle SAAEX of the control shaft 71, and delivers a signal indicative of the sensed turning angle SAAEX to the ECU 2. The exhaust lift is unconditionally determined from the turning angle SAAEX of the control shaft 71, and hence the detected turning angle SAAEX indicates an actual exhaust lift.

On the other hand, the variable exhaust cam phase mechanism 90 steplessly changes the phase CAEX of the exhaust cam shaft 61 relative to the crankshaft 3e (hereinafter referred to as the "exhaust cam phase") to an advanced side or a retarded side. The arrangement of the variable exhaust cam phase mechanism 90 is similar to that proposed in Japanese Laid-Open Patent Publication (Kokai) No. 2005-315161 by the present applicant, and hence hereinafter, a brief description will be given of an outline thereof.

The variable exhaust cam phase mechanism 90 is disposed at an end of the exhaust cam shaft 61 toward an exhaust sprocket, and is comprised of an exhaust cam phase electromagnetic valve 91 (see FIG. 2), and an advancing chamber and a retarding chamber (neither of which is shown) into which oil pressure is supplied through the exhaust cam phase electromagnetic valve 91. The exhaust cam phase electromagnetic valve 91 is connected to the ECU 2, and continuously steplessly varies the exhaust cam phase CAEX between a predetermined most retarded value and a predetermined most advanced value, by varying oil pressure supplied to the advancing chamber and the retarding chamber according to a phase control input U_CAEX delivered from the ECU 2. This steplessly changes the valve timing of the exhaust valves 9 between the most retarded timing indicated by a solid line and the most advanced timing indicated by a two-dot chain line in FIG. 6.

On the other hand, a cam angle sensor 22 (see FIG. 2) is disposed at an end of the exhaust cam shaft 61 on a side thereof remote from the variable exhaust cam phase mechanism 90. The cam angle sensor 22 delivers an EXCAM signal, which is a pulse signal, to the ECU 2 along with rotation of the exhaust cam shaft 61 whenever the exhaust cam shaft 61 rotates through a predetermined cam angle (e.g. 1°). The ECU 2 calculates the exhaust cam phase CAEX based on the EXCAM signal and a CRK signal, referred to hereinafter.

As described above, in the engine 3, the lift and valve timing of the exhaust valves 9 are steplessly changed by the exhaust-side valve-operating mechanism 60, whereby the amount of combustion gases caused to remain in each cylinder 3a, i.e. the internal EGR amount is controlled.

The engine 3 is provided with a crank angle sensor 21. The crank angle sensor 21 is formed by a magnet rotor and an MRE pickup (neither of which is shown), and delivers the CRK signal and a TDC signal, which are both pulse signals, to the ECU 2 along with rotation of the crankshaft 3e.

Each pulse of the CRK signal is generated whenever the crankshaft 3e rotates through a predetermined crank angle (e.g. 30°). The ECU 2 calculates rotational speed (hereinafter referred to as the "engine speed") NE of the engine 3 based on the CRK signal. Further, the TDC signal indicates that a piston 3b of each cylinder 3a is at a predetermined crank angle position in the vicinity of TDC (top dead center) at the start of the suction stroke thereof, and in the case of the four-cylinder engine of the present embodiment, a pulse thereof is delivered whenever the crankshaft rotates through 180 degrees. Further, the engine 3 is provided with a cylinder discrimination sensor (not shown), which delivers a cylinder discrimination signal which is a pulse signal for discriminating each cylinder 3a to the ECU 2. The ECU 2 calculates a crank angle CA for each cylinder 3a, based on the cylinder discrimination signal, the CRK signal, and the TDC signal.

Further, the exhaust pipe 5 of the engine 3 is provided with an exhaust gas temperature sensor 24 and an exhaust pressure sensor 25 at respective locations from upstream to downstream in the mentioned order. The exhaust gas temperature sensor 24 detects temperature in the exhaust pipe 5 (hereinafter referred to as the "exhaust gas temperature") TEX, and the exhaust pressure sensor 25 detects pressure in the exhaust pipe 5 (hereinafter referred to as the "exhaust pressure") PEX, whereby signals indicative of the sensed exhaust gas temperature and the sensed exhaust pressure are delivered to the ECU 2.

The body of the engine 3 is provided with a coolant temperature sensor 26. The coolant temperature sensor 26 detects the temperature of engine coolant (hereinafter referred to as the "engine coolant temperature") TW circulating through a cylinder block 3f of the engine 3, and delivers a signal indicative of the sensed engine coolant temperature TW to the ECU 2.

The intake pipe 4 of the engine 3 is provided an intake air temperature sensor 27. The intake air temperature sensor 27 detects an intake air temperature TA, and delivers a signal indicative of the sensed intake air temperature TA to the ECU 2.

Further, an accelerator pedal opening sensor 28 detects the stepped-on amount of an accelerator pedal, not shown, (hereinafter referred to as the "accelerator pedal opening") AP, and delivers a signal indicative of the sensed accelerator pedal opening AP to the ECU 2.

The ECU 2 is implemented by a microcomputer comprised of an I/O interface, a CPU, a RAM, and a ROM. The ECU 2 carries out control of the engine 3, including control of the fuel injection amount, based on control programs stored in the ROM according to the signals from the aforementioned various sensors 21 to 28. Further, the ECU 2 sets the combustion mode of the engine 3 to either of the SI combustion mode and the CI combustion mode based on the operating conditions of the engine 3, and controls the exhaust-side valve operating mechanism 60 according to the set combustion mode to thereby control the internal EGR amount. In the present embodiment, the ECU 2 corresponds to operating condition-detecting means, target internal EGR amount-setting means, valve-closing timing-calculating means, valve-closing timing-correcting means, control means, and combustion gas temperature-estimating means.

Figure 7:
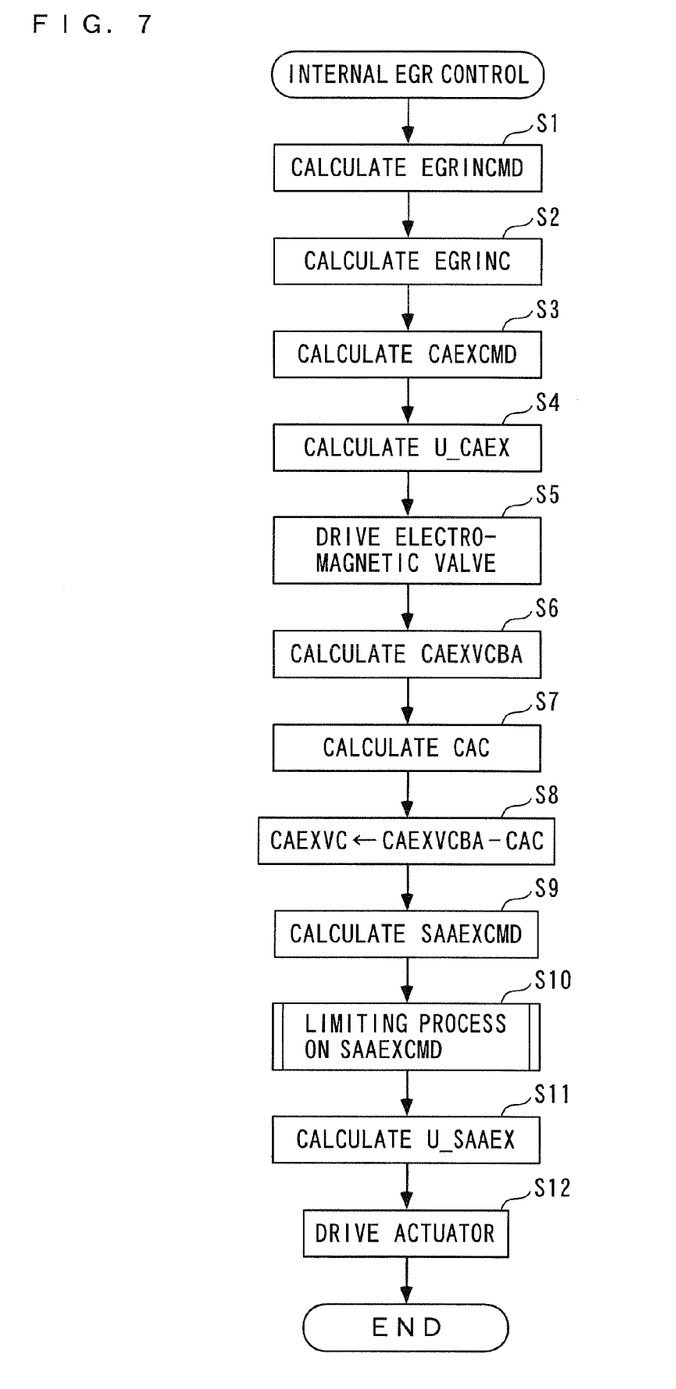
FIG. 7 A flowchart showing a process for controlling the internal EGR according to a first embodiment of the present invention.

FIG. 7 is a flowchart showing a process for controlling the internal EGR according to a first embodiment of the present invention, which is executed by the ECU 2. The present process is carried out in synchronism with generation of each pulse of the TDC signal. First, in a step 1 (shown as S1; the following steps are also shown in the same way), a map (not shown) is searched according to the engine speed NE and a demanded torque PMCMD, to thereby calculate a target internal EGR amount EGRINCMD serving as a target of the internal EGR amount. It should be noted that the demanded torque PMCMD is calculated by searching a map (not shown) according to the engine speed NE and the accelerator pedal opening AP.

Next, the target internal EGR amount EGRINCMD is corrected according to the detected exhaust air temperature TEX and the exhaust pressure PEX using a characteristic equation of gas (PV=nRT) to thereby calculate a final target internal EGR amount EGRINC (step 2).

Next, a map (not shown) is searched according to the calculated target internal EGR amount EGRINC and the engine speed NE to thereby calculate a target cam phase CAEXCMD serving as a target of the exhaust cam phase CAEX (step 3). Then, the phase control input U_CAEX is calculated according to the calculated target cam phase CAEXCMD and the detected actual exhaust cam phase CAEX (step 4), and the exhaust cam phase electromagnetic valve 91 is driven according to the calculated phase control input U_CAEX (step 5). Thus, the exhaust cam phase CAEX is controlled such that it becomes equal to the target cam phase CAEXCMD.

Figure 8:
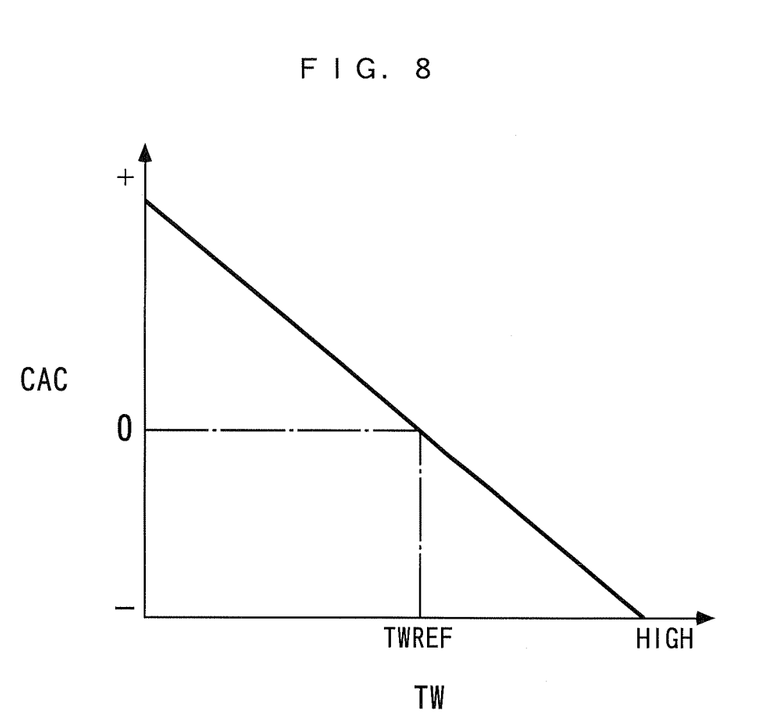
FIG. 8 A diagram showing an example of a table for use in calculating a correction angle used in the FIG. 7 process.

Next, a table (not shown) is searched according to the calculated target internal EGR amount EGRINC, to thereby calculate a basic value CAEXVCBA of a valve-closing crank angle corresponding to the valve-closing timing of each exhaust valve 9 (step 6). Then, according to the detected engine coolant temperature TW, a table shown in FIG. 8 is searched to thereby calculate a correction angle CAC (step 7).

In this table, the correction angle CAC is set to a value of 0 when the engine coolant temperature TW is equal to a predetermined temperature TWREF (e.g. 80° C.), and is linearly set to a larger value, as the engine coolant temperature TW is lower. This is because as the engine coolant temperature TW is lower, the temperature of the wall surface of each cylinder 3a is also lower, which increases loss of heat from combustion gases to the wall surface of each cylinder 3a, whereby the temperature of the working medium before combustion becomes liable to be lowered, and hence the valve-closing timing of each exhaust valve 9 is controlled to be advanced by increasing the correction angle CAC to thereby increase the internal EGR amount to raise the temperature of the working medium. Further, this is because as the engine coolant temperature TW is higher, the valve-closing timing of each exhaust valve 9 is controlled to be more retarded, whereby the internal EGR amount is reduced to thereby prevent preignition.

Next, a value obtained by subtracting the correction angle CAC from the basic value CAEXVCBA is set as a valve-closing crank angle CAEXVC (step 8), and a target turning angle SAAEXCMD serving as a target of the turning angle SAAEX of the control shaft 71 is calculated according to the valve-closing crank angle CAEXVC and the exhaust cam phase CAEX (step 9). Next, a limiting process is carried out on the calculated target turning angle SAAEXCMD (step 10).

Figure 9:
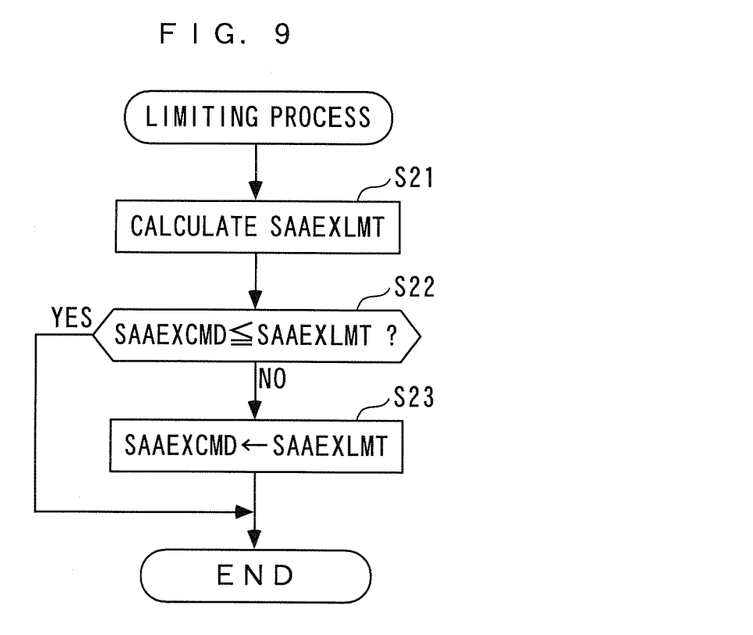
FIG. 9 A flowchart showing a limiting process.
Figure 10:
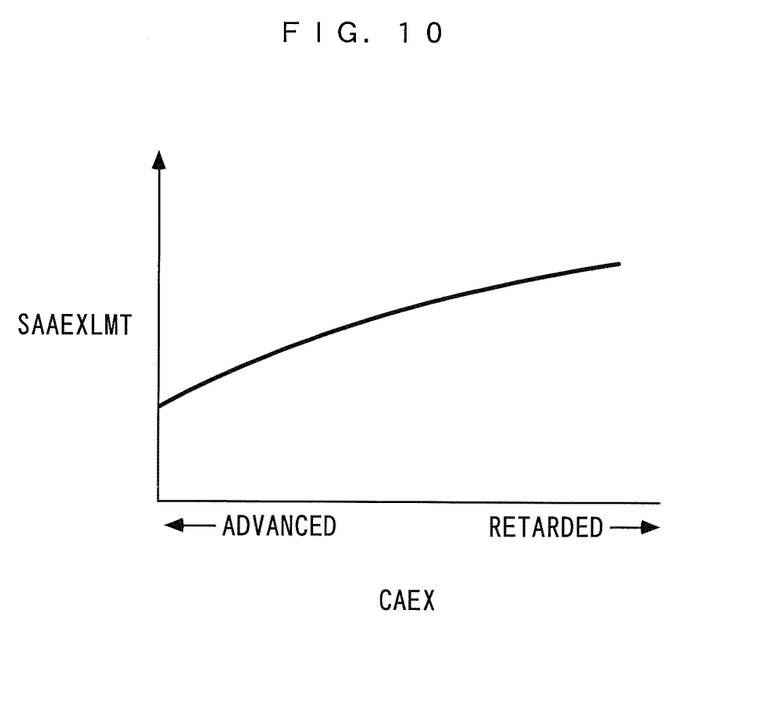
FIG. 10 An example of a table for use in calculating an upper limit value used in the FIG. 9 limiting process.

FIG. 9 is a flowchart showing the limiting process for the target turning angle SAAEXCMD. In the present process, first, in a step 21, a table shown in FIG. 10 is searched according to the exhaust cam phase CAEX to thereby calculate an upper limit value SAAEXLMT of the target turning angle SAAEXCMD. Since the variable exhaust valve lift mechanism 70 is of a type in which as the exhaust valve lift becomes larger, the valve-opening timing of the exhaust valve 9 is advanced, as described above, the upper limit value SAAEXLMT is set so as to prevent the exhaust valve 9 from starting to open fairly before termination of the expansion stroke. Therefore, since the exhaust cam phase CAEX is advanced, the valve-opening timing of the exhaust valves 9 is advanced, and hence, in this table, the upper limit SAAEXLMT is set to a smaller value.

Next, it is determined whether or not the target turning angle SAAEXCMD is not higher than the upper limit value SAAEXLMT (step 22). If the answer to this question is affirmative (YES), the present process is immediately terminated, whereas if the same is negative (NO), i.e. if SAAEXCMD>SAAEXLMT holds, the target turning angle SAAEXCMD is set to the upper limit value SAAEXLMT (step 23), followed by terminating the present process.

Referring again to FIG. 7, in a step 11 following the step 10, the lift control input U_SAAEX is calculated according to the turning angle SAAEX and the target turning angle SAAEXCMD. Next, the exhaust lift actuator 80 is driven according to the lift control input U_SAAEX (step 12). Thus, the turning angle SAAEX is controlled such that it becomes equal to the target turning angle SAAEXCMD.

As described above, according to the present embodiment, the correction angle CAC is subtracted from the basic value CAEXVCBA of the valve-closing crank angle of the exhaust valve 9, which is calculated according to the target internal EGR amount EGRINC, whereby as the engine coolant temperature TW is lower, the valve-closing crank angle CAEXVC of the exhaust valve 9 is set to be advanced to thereby increase the internal EGR amount. Therefore, it is possible to control the internal EGR amount to a proper amount which compensates for influence caused by the heat loss due to the wall surface temperature, to thereby make it possible to properly control the temperature of the working medium before combustion in each cylinder 3a, whereby it is possible to excellently perform the subsequent combustion.

Further, since the result of detection by the coolant temperature sensor 26 usually provided for the engine 3 for the control thereof is made use of, an increase in the cost is not accompanied.

Figure 11:
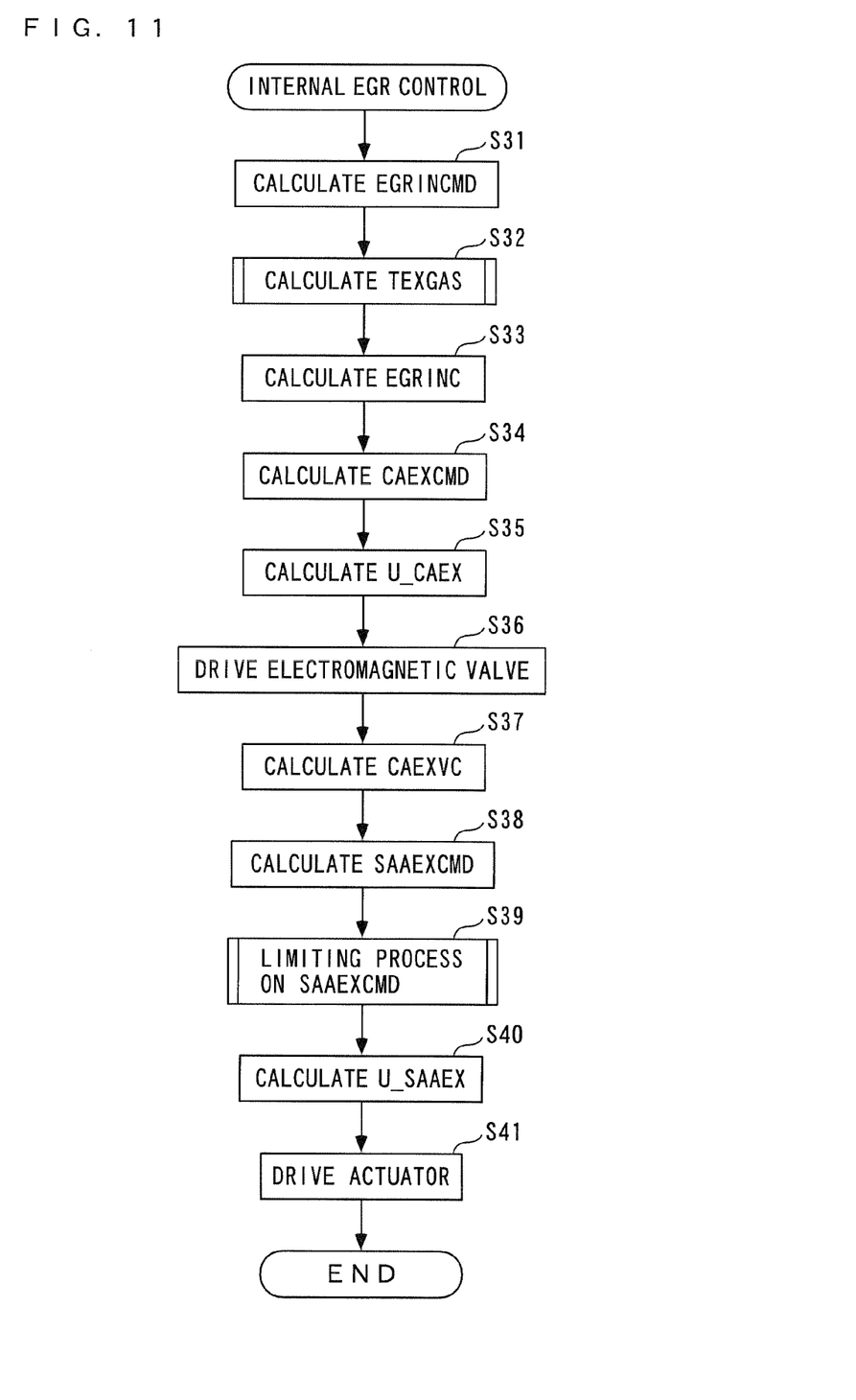
FIG. 11 A flowchart showing a process for controlling the internal EGR according to a second embodiment of the present invention.

FIG. 11 is a flowchart showing the process for controlling the internal EGR according to a second embodiment of the present invention. In the present process, first, in a step 31, a map (not shown) is searched according to the engine speed NE and the demanded torque PMCMD to thereby calculate the target internal EGR amount EGRINCMD serving as a target of the internal EGR amount. Next, a temperature (combustion gas temperature) TEXGAS of combustion gases in the cylinder 3a is calculated (step 32).

Figure 12:
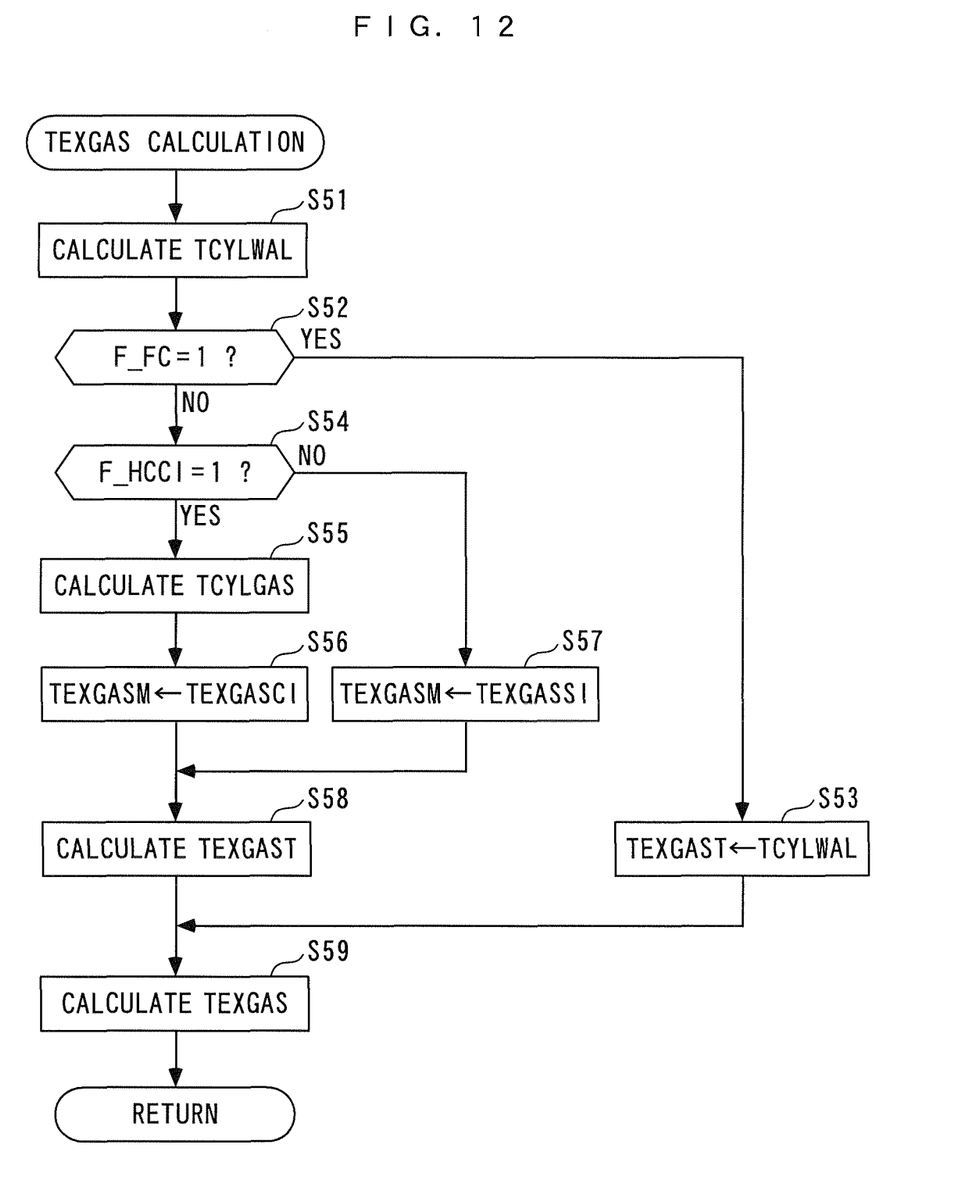
FIG. 12 A flowchart showing a process for calculating combustion gases.
Figure 13:
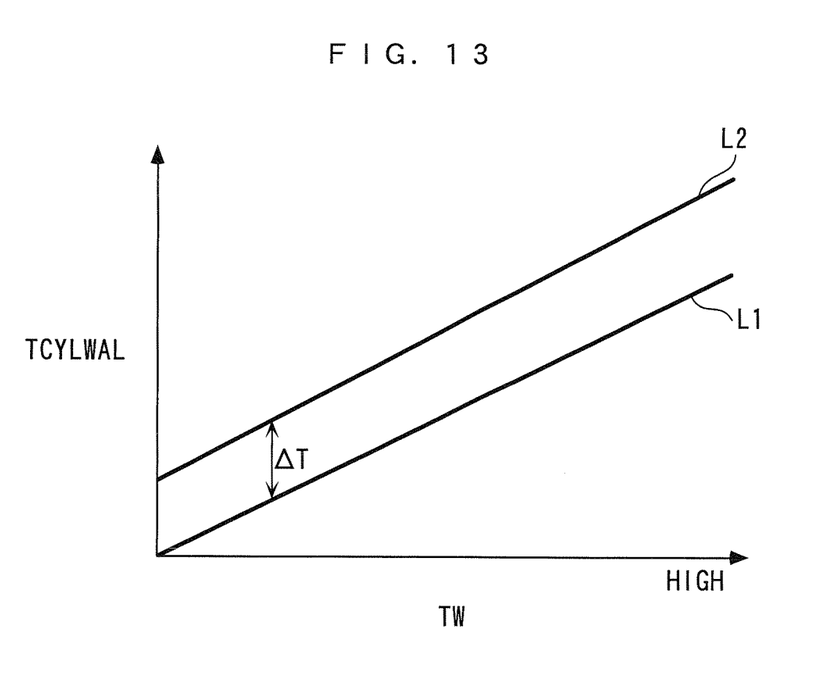
FIG. 13 An example of a map for calculating a wall surface temperature used in the FIG. 12 process.

FIG. 12 is a flowchart showing a process for calculating the combustion gas temperature TEXGAS. In the present process, first, in a step 51, a map shown in FIG. 13 is searched according to the engine coolant temperature TW and a load L to thereby calculate a temperature TCYLWAL of the wall surface (wall surface temperature) of the cylinder 3a. In this map, as the engine coolant temperature TW is higher, the wall surface temperature TCYLWAL is set to a larger value. Further, when the load L is a predetermined first load L1, the wall surface temperature TCYLWAL is set to a value equal to the engine coolant temperature TW (TCYLWAL=TW), and when the load L is a second load L2 which is larger than the first load L1, the wall surface temperature TCYLWAL is set to a value larger than that set when the load L is the first load L1 by ΔT in an entire region of the engine coolant temperature TW. It should be noted that when the load L is not equal to either the first load L1 or the second load L2, the wall surface temperature TCYLWAL is determined by interpolation.

Next, it is determined whether or not a fuel cut flag F_FC is equal to 1 (step 52). If the answer to this question is affirmative (YES), i.e. if the fuel cut operation in which fuel supply to the engine 3 is cut off is being executed, the wall surface temperature TCYLWAL calculated in the step 51 is set as a provisional value of the combustion gas temperature TEXGAST (step 53), and the process proceeds to a step 59. Thus, since combustion is not performed during the fuel cut operation, the wall surface temperature TCYLWAL is directly used as the provisional value of combustion gas temperature TEXGAST.

On the other hand, if the answer to the question of the step 52 is negative (NO), i.e. if the fuel cut operation is not being executed, it is determined whether or not a CI combustion mode flag F_HCCI is equal to 1 (step 54). The CI combustion mode flag F_HCCI is set to 1 when the combustion mode is the CI combustion mode. If the answer to this question is affirmative (YES), i.e. if the combustion mode is the CI combustion mode, a map (not shown) is searched according to the engine speed NE and the demanded torque PMCMD to thereby calculate a temperature TCYLGAS of the working medium in the cylinder 3a (hereinafter referred to as "the working medium temperature") (step 55).

Figure 14:
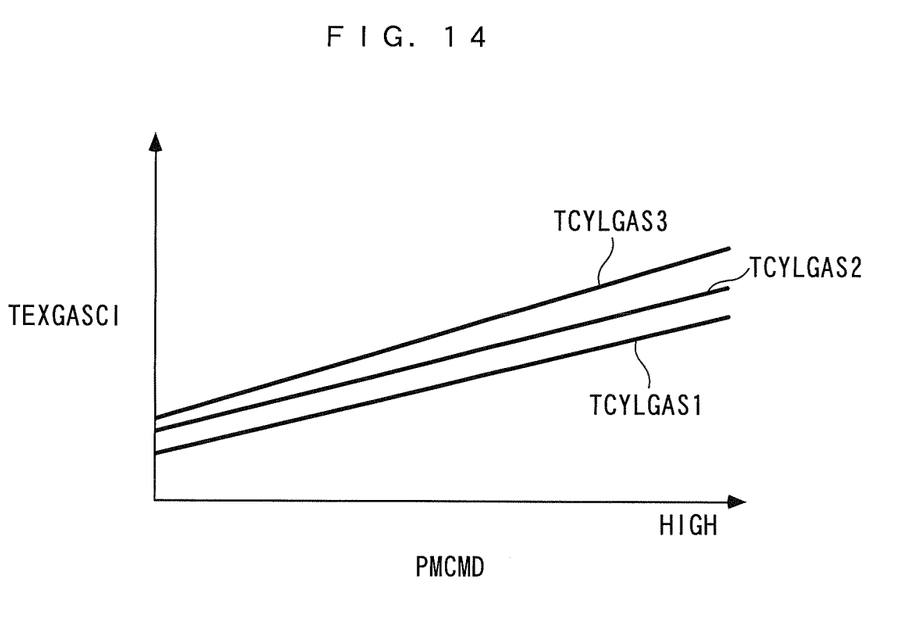
FIG. 14 An example of a map for calculating an working medium temperature used in the FIG. 12 process.

Next, a map value TEXGASCI for the CI combustion is retrieved from a map shown in FIG. 14 according to the calculated working medium temperature TCYLGAS and the demanded torque PMCMD, and is set as a maximum rotation temperature TEXGASM (step 56). The maximum rotation temperature TEXGASM corresponds to the temperature of combustion gases when the engine speed NE is equal to the maximum speed (e.g. 6000 rpm). This map sets the temperature of combustion gases obtained with respect to the working medium temperature TCYLGAS and the demanded torque PMCMD when the engine speed NE reaches the maximum speed. In this map, as the demanded torque PMCMD is larger and the working medium temperature TCYLGAS is higher, the map value TEXGASCI is set to a larger value, and if the working medium temperature TCYLGAS is not equal to any of the first to third temperature TCYLGAS1 to TCYLGAS3, the map value TEXGASCI is determined by interpolation.

If the answer to the question of the step 54 is negative (NO), i.e. if the combustion mode is the SI combustion mode, a map value for the SI combustion TEXGASSI is retrieved from a map (not shown) according to the intake air temperature TA and the demanded torque PMCMD and is set to the maximum rotation temperature TEXGASM (step 57). In this map, as the demanded torque PMCMD is larger and the intake air temperature TA is higher, the map value TEXGASSI is set to a larger value. Further, in this map, as a parameter for calculating the maximum rotation temperature TEXGASM, the intake air temperature TA is used instead of the working medium temperature TCYLGAS. This is because during the SI combustion, the internal EGR amount is basically equal to a value of 0, which causes no influence on the combustion gases.

In a step 58 following the step 56 or 57, by using the wall surface temperature TCYLWAL and the maximum rotation temperature TEXGASM, the provisional value of the combustion gas temperature TEXGAST is calculated by the following equation (1):

$$TEXGAST = TEXGASM * [1 - KTEXGME * (TDCME - 5)] + TCYLWAL * KTEXGME * (TDCME - 5) \quad (1)$$

wherein KTEXGME represents an averaging coefficient which is less than a value of 1.0, TDCME represents a generation period of the TDC signal, and a value of 5 represents the generation period of the TDC signal when the engine speed NE is equal to the maximum speed. As is clear from the above, the provisional value of the combustion gas temperature TEXGAST is determined as a weighted average of the maximum rotation temperature TEXGASM and the wall surface temperature TCYLWAL. Since the time interval between combustion cycles is short at the maximum speed, the degree of lowering of the temperature of combustion gases after combustion is very small. Therefore, by using the maximum rotation temperature TEXGASM, it is possible to improve the accuracy of calculating the provisional value of the combustion gas temperature TEXGAST. Further, by (TDCME−5) in the right side, the weight of the wall surface temperature TCYLWAL is increased as the engine speed NE is lower, and hence it is possible to determine the provisional value of the combustion gas temperature TEXGAST with accuracy according to the time interval between the combustion cycles, while causing the influence caused by the heat loss due to the wall surface temperature TCYLWAL to be reflected thereon.

In the step 59 following the step 53 or 58, the combustion gas temperature TEXGAS is calculated using the provisional value of the combustion gas temperature TEXGAST, by the following equation (2), followed by terminating the present process.

$$TEXGAS = TEXGAST*(1-TDTGAS) + TEXGASZ*TDTGAS \quad (2)$$

wherein, TEXGASZ represents an immediately preceding value of the combustion gas calculated by the equation (2), and TDTGAS is an averaging coefficient which is less than a value of 1.0.

Referring again to FIG. 11, in a step 33, the target internal EGR amount EGRINCMD is corrected according to the combustion gas temperature TEXGAS calculated in the step 32 and the detected exhaust pressure PEX using the characteristic equation of gas (PV=nRT) to thereby calculate the final target internal EGR amount EGRINC.

Next, similarly to the steps 3 to 5 in FIG. 7, according to the target internal EGR amount EGRINC and the engine speed NE, a map (not shown) is searched to thereby calculate the target cam phase CAEXCMD, the phase control input U_CAEX is calculated according to the calculated target cam phase CAEXCMD and the actual exhaust cam phase CAEX, and the exhaust cam phase electromagnetic valve 91 is driven according to the calculated phase control input U_CAEX (steps 34 to 36). As a result, the exhaust cam phase CAEX is controlled such that it becomes equal to the target cam phase CAEXCMD.

Next, a table (now shown) is searched according to the target internal EGR amount EGRINC to thereby calculate the valve-closing crank angle CAEXVC of the exhaust valve 9 (step 37). Then, similarly to the steps 9 to 12, the target turning angle SAAEXCMD of the control shaft 71 is calculated according to the valve-closing crank angle CAEXVC and the exhaust cam phase CAEX, and after executing the limiting process for the calculated target turning angle SAAEXCMD, the lift control input U_SAAEX is calculated according to the turning angle SAAEX and the target turning angle SAAEXCMD. Next, the exhaust lift actuator 80 is driven according to the calculated lift control input U_SAAEX (step 38 to 41). As a result, the turning angle SAAEX is controlled such that it becomes equal to the target turning angle SAAEXCMD.

As described above, according to the present embodiment, the wall surface temperature TCYLWAL of the cylinder 3a is calculated according to the engine coolant temperature TW, and the combustion gas temperature TEXGAS is calculated according to the calculated wall surface temperature TCYLWAL, and therefore it is possible to properly calculate the combustion gas temperature TEXGAS while compensating for the heat loss due to the wall surface temperature TCYLWAL. Further, the final target internal EGR amount EGRINC is calculated by correcting the target internal EGR amount EGRINCMD according to the combustion gas temperature TEXGAS. Therefore, the internal EGR amount can be controlled to an appropriate value which compensates for influence caused by the heat loss due to the wall surface temperature TCYLWAL, and hence it is possible to properly control the temperature of the working medium before combustion in the cylinder 3a, whereby it is possible to ensure the excellent combustion state.

The present invention is by no means limited to the above-described embodiments, but may be practiced in various forms. For example, although in the above-described embodiments, the engine coolant temperature TW detected by the coolant temperature sensor 26 is used as a wall surface temperature parameter representative of the wall surface temperature of the cylinder 3a, this is not limitative, but any other parameter may be used insofar as it can represent the temperature of the wall surface of the cylinder. For example, the temperature of the wall surface of the cylinder may be calculated based on an external air temperature, a stopping time of the engine before being operated, and an operating time and operating conditions after the start of the engine. Further, although in the above-described embodiments, the internal EGR amount is controlled by both of the variable exhaust cam phase mechanism and the variable exhaust lift mechanism, this is not limitative, but for example, the internal EGR amount may be controlled by one of the variable mechanisms.

Further, although in the above-described embodiments, the present invention is applied to the gasoline engine installed on an automotive vehicle by way of example, this is not limitative, but it can be applied to various types of engines, such as diesel engines other than gasoline engine, and engines for other than automotive vehicles, such as engines for ship propulsion machines, e.g. an outboard motor having a vertically-disposed crankshaft.

INDUSTRIAL APPLICABILITY

As described above, the internal EGR control system for an internal combustion engine according to the first and second embodiments of the present invention can be applied to various kinds of internal combustion engines, as the internal EGR control system which is capable of ensuring the excellent combustion state by properly controlling the internal EGR amount.

The invention claimed is:

1. An internal EGR control system for an internal combustion engine, for controlling internal EGR in which combustion gases are caused to remain in a cylinder, comprising:
  a variable valve operating mechanism that controls an internal EGR amount by changing valve-closing timing of exhaust valves of the engine;
  operating condition-detecting means for detecting operating conditions of the engine;
  target internal EGR amount-setting means for setting a target internal EGR amount serving as a target of the internal EGR amount according to the detected operating conditions of the engine;
  valve-closing timing-calculating means for calculating valve-closing timing of the exhaust valves according to the set target internal EGR amount;
  wall surface temperature parameter-acquiring means for acquiring a wall surface temperature parameter indicative of temperature of a wall surface of the cylinder;

valve-closing timing-correcting means for correcting the calculated valve-closing timing of the exhaust valves according to the acquired wall surface temperature parameter; and control means for controlling the variable valve operating mechanism based on the corrected valve-closing timing of the exhaust valves.

2. An internal EGR control system for an internal combustion engine, for controlling internal EGR in which combustion gases are caused to remain in a cylinder, comprising:

a variable valve operating mechanism that controls an internal EGR amount by changing valve-closing timing of exhaust valves of the engine;

wall surface temperature parameter-acquiring means for acquiring a wall surface temperature parameter indicative of temperature of a wall surface of the cylinder;

combustion gas temperature-estimating means for estimating temperature of combustion gases according to the acquired wall surface temperature parameter;

operating condition-detecting means for detecting operating conditions of the engine;

target internal EGR amount-setting means for setting a target internal EGR amount serving as a target of the internal EGR amount according to the estimated temperature of combustion gases and the detected operating condition of the engine;

valve-closing timing-calculating means for calculating valve-closing timing of the exhaust valves according to the set target internal EGR amount; and control means for controlling the variable valve operating mechanism based on the calculated valve-closing timing of the exhaust valves.

3. An internal EGR control system as claimed in claim 1 or 2, wherein the wall surface temperature parameter is coolant temperature of the engine.

* * * * *